(12) United States Patent
Zhao

(10) Patent No.: US 9,389,135 B2
(45) Date of Patent: Jul. 12, 2016

(54) SYSTEMS AND METHODS FOR CALIBRATING A LOAD CELL OF A DISK BURNISHING MACHINE

(71) Applicant: WD Media, LLC, San Jose, CA (US)

(72) Inventor: Jinmin Zhao, Singapore (SG)

(73) Assignee: WD Media, LLC, San Jose, CA (US)

( * ) Notice: Subject to any disclaimer, the term of this patent is extended or adjusted under 35 U.S.C. 154(b) by 127 days.

(21) Appl. No.: 14/200,666

(22) Filed: Mar. 7, 2014

(65) Prior Publication Data

US 2015/0082858 A1 Mar. 26, 2015

Related U.S. Application Data

(60) Provisional application No. 61/882,707, filed on Sep. 26, 2013.

(51) Int. Cl.
*G01L 25/00* (2006.01)
*G01G 21/26* (2006.01)

(52) U.S. Cl.
CPC .............. *G01L 25/00* (2013.01); *G01G 21/26* (2013.01)

(58) Field of Classification Search
CPC ...... G01L 25/00; G01G 5/003; G01G 23/012; G01G 3/13; G01G 3/1402; G01G 3/1408; G01G 3/141; G01G 3/1412; G01G 21/22; G01G 1/28; G01G 23/01; G01G 21/26; B25B 1/125
USPC ............. 73/1.15, 1.13; 177/244, 50, 264, 177/253–263
See application file for complete search history.

(56) References Cited

U.S. PATENT DOCUMENTS

| | | | |
|---|---|---|---|
| 298,704 A * | 5/1884 | Norris | B25B 1/103 254/98 |
| 3,263,496 A | 8/1966 | Fathauer | |
| 4,553,872 A * | 11/1985 | Chandra | B25B 5/101 248/228.6 |
| 4,660,663 A | 4/1987 | Amacher et al. | |
| 4,716,979 A * | 1/1988 | Bradley | G01G 5/003 177/208 |
| 4,722,407 A | 2/1988 | Gindy et al. | |
| 4,759,493 A * | 7/1988 | Bradley | G01G 5/003 228/182 |
| 5,210,706 A | 5/1993 | Nishiyama | |
| 5,245,872 A | 9/1993 | Cooper et al. | |
| 5,640,334 A | 6/1997 | Freeman et al. | |
| 5,703,334 A | 12/1997 | Hansson et al. | |
| 6,013,161 A | 1/2000 | Chen et al. | |

(Continued)

OTHER PUBLICATIONS

International Search Report and Written Opinion dated Jan. 8, 2015 from related PCT Serial No. PCT/US2014/057562, 13 pages.

*Primary Examiner* — Peter MacChiarolo
*Assistant Examiner* — David L Singer

(57) ABSTRACT

Systems and methods for performing in situ testing of a load cell disposed within a disk burnishing machine are provided. One such system includes a load cell bracket attached to a component of the disk burnishing machine, where the load cell is mounted within the load cell bracket and has a force measuring surface. The load cell bracket can be oriented such that the force measuring surface faces a direction that is about opposite to a direction of gravity. The system can further include a preselected weight and a weight holder configured to receive the preselected weight, to be mounted to the load cell bracket, and to be aligned with the load cell. The preselected weight can be positioned within the weight holder and on the force measuring surface of the load cell. The load cell can then be tested, calibrated, and/or replaced if necessary.

30 Claims, 6 Drawing Sheets

(56) References Cited

U.S. PATENT DOCUMENTS

| | | | |
|---|---|---|---|
| 6,063,248 | A | 5/2000 | Bourez et al. |
| 6,068,891 | A | 5/2000 | O'Dell et al. |
| 6,086,730 | A | 7/2000 | Liu et al. |
| 6,099,981 | A | 8/2000 | Nishimori |
| 6,103,404 | A | 8/2000 | Ross et al. |
| 6,117,499 | A | 9/2000 | Wong et al. |
| 6,136,403 | A | 10/2000 | Prabhakara et al. |
| 6,143,375 | A | 11/2000 | Ross et al. |
| 6,145,849 | A | 11/2000 | Bae et al. |
| 6,146,737 | A | 11/2000 | Malhotra et al. |
| 6,149,696 | A | 11/2000 | Jia |
| 6,150,015 | A | 11/2000 | Bertero et al. |
| 6,156,404 | A | 12/2000 | Ross et al. |
| 6,159,076 | A | 12/2000 | Sun et al. |
| 6,164,118 | A | 12/2000 | Suzuki et al. |
| 6,200,441 | B1 | 3/2001 | Gornicki et al. |
| 6,204,995 | B1 | 3/2001 | Hokkyo et al. |
| 6,206,765 | B1 | 3/2001 | Sanders et al. |
| 6,210,819 | B1 | 4/2001 | Lal et al. |
| 6,216,709 | B1 | 4/2001 | Fung et al. |
| 6,221,119 | B1 | 4/2001 | Homola |
| 6,248,395 | B1 | 6/2001 | Homola et al. |
| 6,261,681 | B1 | 7/2001 | Suekane et al. |
| 6,270,885 | B1 | 8/2001 | Hokkyo et al. |
| 6,274,063 | B1 | 8/2001 | Li et al. |
| 6,283,838 | B1 * | 9/2001 | Blake .................. B24B 7/17 451/168 |
| 6,287,429 | B1 | 9/2001 | Moroishi et al. |
| 6,290,573 | B1 | 9/2001 | Suzuki |
| 6,299,947 | B1 | 10/2001 | Suzuki et al. |
| 6,303,217 | B1 | 10/2001 | Malhotra et al. |
| 6,309,765 | B1 | 10/2001 | Suekane et al. |
| 6,358,636 | B1 | 3/2002 | Yang et al. |
| 6,362,452 | B1 | 3/2002 | Suzuki et al. |
| 6,363,599 | B1 | 4/2002 | Bajorek |
| 6,365,012 | B1 | 4/2002 | Sato et al. |
| 6,381,090 | B1 | 4/2002 | Suzuki et al. |
| 6,381,092 | B1 | 4/2002 | Suzuki |
| 6,387,483 | B1 | 5/2002 | Hokkyo et al. |
| 6,391,213 | B1 | 5/2002 | Homola |
| 6,395,349 | B1 | 5/2002 | Salamon |
| 6,403,919 | B1 | 6/2002 | Salamon |
| 6,408,677 | B1 | 6/2002 | Suzuki |
| 6,408,678 | B1 | 6/2002 | Chopra et al. |
| 6,426,157 | B1 | 7/2002 | Hokkyo et al. |
| 6,429,984 | B1 | 8/2002 | Alex |
| 6,482,330 | B1 | 11/2002 | Bajorek |
| 6,482,505 | B1 | 11/2002 | Bertero et al. |
| 6,500,567 | B1 | 12/2002 | Bertero et al. |
| 6,528,124 | B1 | 3/2003 | Nguyen |
| 6,548,821 | B1 | 4/2003 | Treves et al. |
| 6,552,871 | B2 | 4/2003 | Suzuki et al. |
| 6,557,391 | B2 | 5/2003 | Luchinger |
| 6,565,719 | B1 | 5/2003 | Lairson et al. |
| 6,566,674 | B1 | 5/2003 | Treves et al. |
| 6,571,806 | B2 | 6/2003 | Rosano et al. |
| 6,628,466 | B2 | 9/2003 | Alex |
| 6,664,503 | B1 | 12/2003 | Hsieh et al. |
| 6,670,055 | B2 | 12/2003 | Tomiyasu et al. |
| 6,682,807 | B2 | 1/2004 | Lairson et al. |
| 6,683,754 | B2 | 1/2004 | Suzuki et al. |
| 6,730,420 | B1 | 5/2004 | Bertero et al. |
| 6,743,528 | B2 | 6/2004 | Suekane et al. |
| 6,759,138 | B2 | 7/2004 | Tomiyasu et al. |
| 6,778,353 | B1 | 8/2004 | Harper |
| 6,792,371 | B1 | 9/2004 | Turner |
| 6,795,274 | B1 | 9/2004 | Hsieh et al. |
| 6,855,232 | B2 | 2/2005 | Jairson et al. |
| 6,857,937 | B2 | 2/2005 | Bajorek |
| 6,893,748 | B2 | 5/2005 | Bertero et al. |
| 6,899,959 | B2 | 5/2005 | Bertero et al. |
| 6,916,558 | B2 | 7/2005 | Umezawa et al. |
| 6,939,120 | B1 | 9/2005 | Harper |
| 6,946,191 | B2 | 9/2005 | Morikawa et al. |
| 6,967,798 | B2 | 11/2005 | Homola et al. |
| 6,972,135 | B2 | 12/2005 | Homola |
| 7,004,827 | B1 | 2/2006 | Suzuki et al. |
| 7,006,323 | B1 | 2/2006 | Suzuki |
| 7,016,154 | B2 | 3/2006 | Nishihira |
| 7,019,924 | B2 | 3/2006 | McNeil et al. |
| 7,043,376 | B2 | 5/2006 | Chuang |
| 7,045,215 | B2 | 5/2006 | Shimokawa |
| 7,070,870 | B2 | 7/2006 | Bertero et al. |
| 7,090,934 | B2 | 8/2006 | Hokkyo et al. |
| 7,094,129 | B2 | 8/2006 | Gillis et al. |
| 7,099,112 | B1 | 8/2006 | Harper |
| 7,105,241 | B2 | 9/2006 | Shimokawa et al. |
| 7,119,990 | B2 | 10/2006 | Bajorek et al. |
| 7,147,790 | B2 | 12/2006 | Wachenschwanz et al. |
| 7,161,753 | B2 | 1/2007 | Wachenschwanz et al. |
| 7,166,319 | B2 | 1/2007 | Ishiyama |
| 7,166,374 | B2 | 1/2007 | Suekane et al. |
| 7,169,487 | B2 | 1/2007 | Kawai et al. |
| 7,174,775 | B2 | 2/2007 | Ishiyama |
| 7,179,549 | B2 | 2/2007 | Malhotra et al. |
| 7,184,139 | B2 | 2/2007 | Treves et al. |
| 7,196,860 | B2 | 3/2007 | Alex |
| 7,199,977 | B2 | 4/2007 | Suzuki et al. |
| 7,208,236 | B2 | 4/2007 | Morikawa et al. |
| 7,220,500 | B1 | 5/2007 | Tomiyasu et al. |
| 7,229,266 | B2 | 6/2007 | Harper |
| 7,239,970 | B2 | 7/2007 | Treves et al. |
| 7,252,897 | B2 | 8/2007 | Shimokawa et al. |
| 7,277,254 | B2 | 10/2007 | Shimokawa et al. |
| 7,281,920 | B2 | 10/2007 | Homola et al. |
| 7,292,329 | B2 | 11/2007 | Treves et al. |
| 7,301,726 | B1 | 11/2007 | Suzuki |
| 7,302,148 | B2 | 11/2007 | Treves et al. |
| 7,305,119 | B2 | 12/2007 | Treves et al. |
| 7,314,404 | B2 | 1/2008 | Singh et al. |
| 7,320,584 | B1 | 1/2008 | Harper et al. |
| 7,329,114 | B2 | 2/2008 | Harper et al. |
| 7,375,362 | B2 | 5/2008 | Treves et al. |
| 7,420,886 | B2 | 9/2008 | Tomiyasu et al. |
| 7,425,719 | B2 | 9/2008 | Treves et al. |
| 7,471,484 | B2 | 12/2008 | Wachenschwanz et al. |
| 7,498,062 | B2 | 3/2009 | Calcaterra et al. |
| 7,531,485 | B2 | 5/2009 | Hara et al. |
| 7,537,846 | B2 | 5/2009 | Ishiyama et al. |
| 7,549,209 | B2 | 6/2009 | Wachenschwanz et al. |
| 7,569,490 | B2 | 8/2009 | Staud |
| 7,597,792 | B2 | 10/2009 | Homola et al. |
| 7,597,973 | B2 | 10/2009 | Ishiyama |
| 7,608,193 | B2 | 10/2009 | Wachenschwanz et al. |
| 7,632,087 | B2 | 12/2009 | Homola |
| 7,656,615 | B2 | 2/2010 | Wachenschwanz et al. |
| 7,682,546 | B2 | 3/2010 | Harper |
| 7,684,152 | B2 | 3/2010 | Suzuki et al. |
| 7,686,606 | B2 | 3/2010 | Harper et al. |
| 7,686,991 | B2 | 3/2010 | Harper |
| 7,695,833 | B2 | 4/2010 | Ishiyama |
| 7,722,968 | B2 | 5/2010 | Ishiyama |
| 7,733,605 | B2 | 6/2010 | Suzuki et al. |
| 7,736,768 | B2 | 6/2010 | Ishiyama |
| 7,755,861 | B1 | 7/2010 | Li et al. |
| 7,758,732 | B1 | 7/2010 | Calcaterra et al. |
| 7,833,639 | B2 | 11/2010 | Sonobe et al. |
| 7,833,641 | B2 | 11/2010 | Tomiyasu et al. |
| 7,910,159 | B2 | 3/2011 | Jung |
| 7,911,736 | B2 | 3/2011 | Bajorek |
| 7,924,519 | B2 | 4/2011 | Lambert |
| 7,944,165 | B1 | 5/2011 | O'Dell |
| 7,944,643 | B1 | 5/2011 | Jiang et al. |
| 7,955,723 | B2 | 6/2011 | Umezawa et al. |
| 7,983,003 | B2 | 7/2011 | Sonobe et al. |
| 7,993,497 | B2 | 8/2011 | Moroishi et al. |
| 7,993,765 | B2 | 8/2011 | Kim et al. |
| 7,998,912 | B2 | 8/2011 | Chen et al. |
| 8,002,901 | B1 | 8/2011 | Chen et al. |
| 8,003,237 | B2 | 8/2011 | Sonobe et al. |
| 8,012,920 | B2 | 9/2011 | Shimokawa |
| 8,038,863 | B2 | 10/2011 | Homola |
| 8,057,926 | B2 | 11/2011 | Ayama et al. |
| 8,062,778 | B2 | 11/2011 | Suzuki et al. |

(56) References Cited

U.S. PATENT DOCUMENTS

| | | |
|---|---|---|
| 8,064,156 B1 | 11/2011 | Suzuki et al. |
| 8,076,013 B2 | 12/2011 | Sonobe et al. |
| 8,092,931 B2 | 1/2012 | Ishiyama et al. |
| 8,100,685 B1 | 1/2012 | Harper et al. |
| 8,101,054 B2 | 1/2012 | Chen et al. |
| 8,125,723 B1 | 2/2012 | Nichols et al. |
| 8,125,724 B1 | 2/2012 | Nichols et al. |
| 8,137,517 B1 | 3/2012 | Bourez |
| 8,142,916 B2 | 3/2012 | Umezawa et al. |
| 8,163,093 B1 | 4/2012 | Chen et al. |
| 8,171,949 B1 | 5/2012 | Lund et al. |
| 8,173,282 B1 | 5/2012 | Sun et al. |
| 8,178,480 B2 | 5/2012 | Hamakubo et al. |
| 8,206,789 B2 | 6/2012 | Suzuki |
| 8,218,260 B2 | 7/2012 | Iamratanakul et al. |
| 8,247,095 B2 | 8/2012 | Champion et al. |
| 8,250,720 B2 | 8/2012 | Tomioka et al. |
| 8,257,783 B2 | 9/2012 | Suzuki et al. |
| 8,298,609 B1 | 10/2012 | Liew et al. |
| 8,298,689 B2 | 10/2012 | Sonobe et al. |
| 8,309,239 B2 | 11/2012 | Umezawa et al. |
| 8,316,668 B1 | 11/2012 | Chan et al. |
| 8,331,056 B2 | 12/2012 | O'Dell |
| 8,354,618 B1 | 1/2013 | Chen et al. |
| 8,367,228 B2 | 2/2013 | Sonobe et al. |
| 8,383,209 B2 | 2/2013 | Ayama |
| 8,394,243 B1 | 3/2013 | Jung et al. |
| 8,397,751 B1 | 3/2013 | Chan et al. |
| 8,399,809 B1 | 3/2013 | Bourez |
| 8,402,638 B1 | 3/2013 | Treves et al. |
| 8,404,056 B1 | 3/2013 | Chen et al. |
| 8,404,369 B2 | 3/2013 | Ruffini et al. |
| 8,404,370 B2 | 3/2013 | Sato et al. |
| 8,406,918 B2 | 3/2013 | Tan et al. |
| 8,414,966 B2 | 4/2013 | Yasumori et al. |
| 8,425,975 B2 | 4/2013 | Ishiyama |
| 8,431,257 B2 | 4/2013 | Kim et al. |
| 8,431,258 B2 | 4/2013 | Onoue et al. |
| 8,453,315 B2 | 6/2013 | Kajiwara et al. |
| 8,488,276 B1 | 7/2013 | Jung et al. |
| 8,491,800 B1 | 7/2013 | Dorsey |
| 8,492,009 B1 | 7/2013 | Homola et al. |
| 8,492,011 B2 | 7/2013 | Itoh et al. |
| 8,496,466 B1 | 7/2013 | Treves et al. |
| 8,517,364 B1 | 8/2013 | Crumley et al. |
| 8,517,657 B2 | 8/2013 | Chen et al. |
| 8,524,052 B1 | 9/2013 | Tan et al. |
| 8,530,065 B1 | 9/2013 | Chernyshov et al. |
| 8,546,000 B2 | 10/2013 | Umezawa |
| 8,551,253 B2 | 10/2013 | Na'im et al. |
| 8,551,627 B2 | 10/2013 | Shimada et al. |
| 8,556,566 B1 | 10/2013 | Suzuki et al. |
| 8,559,131 B2 | 10/2013 | Masuda et al. |
| 8,562,748 B1 | 10/2013 | Chen et al. |
| 8,565,050 B1 | 10/2013 | Bertero et al. |
| 8,570,844 B1 | 10/2013 | Yuan et al. |
| 8,580,410 B2 | 11/2013 | Onoue |
| 8,584,687 B1 | 11/2013 | Chen et al. |
| 8,591,709 B1 | 11/2013 | Lim et al. |
| 8,592,061 B2 | 11/2013 | Onoue et al. |
| 8,596,287 B1 | 12/2013 | Chen et al. |
| 8,597,723 B1 | 12/2013 | Jung et al. |
| 8,603,649 B2 | 12/2013 | Onoue |
| 8,603,650 B2 | 12/2013 | Sonobe et al. |
| 8,605,388 B2 | 12/2013 | Yasumori et al. |
| 8,605,555 B1 | 12/2013 | Chernyshov et al. |
| 8,608,147 B1 | 12/2013 | Yap et al. |
| 8,609,263 B1 | 12/2013 | Chernyshov et al. |
| 8,619,381 B2 | 12/2013 | Moser et al. |
| 8,623,528 B2 | 1/2014 | Umezawa et al. |
| 8,623,529 B2 | 1/2014 | Suzuki |
| 8,634,155 B2 | 1/2014 | Yasumori et al. |
| 8,658,003 B1 | 2/2014 | Bourez |
| 8,658,292 B1 | 2/2014 | Mallary et al. |
| 8,665,541 B2 | 3/2014 | Saito |
| 8,668,953 B1 | 3/2014 | Buechel-Rimmel |
| 8,674,327 B1 | 3/2014 | Poon et al. |
| 8,685,214 B1 | 4/2014 | Moh et al. |
| 2002/0038567 A1* | 4/2002 | Luchinger ............ G01G 21/22 73/1.13 |
| 2002/0060883 A1 | 5/2002 | Suzuki |
| 2003/0022024 A1 | 1/2003 | Wachenschwanz |
| 2004/0022387 A1 | 2/2004 | Weikle |
| 2004/0081457 A1 | 4/2004 | Britcher et al. |
| 2004/0132301 A1 | 7/2004 | Harper et al. |
| 2004/0198181 A1 | 10/2004 | Tajima et al. |
| 2004/0202793 A1 | 10/2004 | Harper et al. |
| 2004/0202865 A1 | 10/2004 | Homola et al. |
| 2004/0209123 A1 | 10/2004 | Bajorek et al. |
| 2004/0209470 A1 | 10/2004 | Bajorek |
| 2005/0036223 A1 | 2/2005 | Wachenschwanz et al. |
| 2005/0142990 A1 | 6/2005 | Homola |
| 2005/0150862 A1 | 7/2005 | Harper et al. |
| 2005/0151282 A1 | 7/2005 | Harper et al. |
| 2005/0151283 A1 | 7/2005 | Bajorek et al. |
| 2005/0151300 A1 | 7/2005 | Harper et al. |
| 2005/0155554 A1 | 7/2005 | Saito |
| 2005/0167867 A1 | 8/2005 | Bajorek et al. |
| 2005/0263401 A1 | 12/2005 | Olsen et al. |
| 2006/0147758 A1 | 7/2006 | Jung et al. |
| 2006/0181697 A1 | 8/2006 | Treves et al. |
| 2006/0207890 A1 | 9/2006 | Staud |
| 2007/0070549 A1 | 3/2007 | Suzuki et al. |
| 2007/0245909 A1 | 10/2007 | Homola |
| 2008/0075845 A1 | 3/2008 | Sonobe et al. |
| 2008/0093760 A1 | 4/2008 | Harper et al. |
| 2009/0117408 A1 | 5/2009 | Umezawa et al. |
| 2009/0136784 A1 | 5/2009 | Suzuki et al. |
| 2009/0169922 A1 | 7/2009 | Ishiyama |
| 2009/0191331 A1 | 7/2009 | Umezawa et al. |
| 2009/0202866 A1 | 8/2009 | Kim et al. |
| 2009/0311557 A1 | 12/2009 | Onoue et al. |
| 2010/0114507 A1 | 5/2010 | Bachmann et al. |
| 2010/0143752 A1 | 6/2010 | Ishibashi et al. |
| 2010/0190035 A1 | 7/2010 | Sonobe et al. |
| 2010/0196619 A1 | 8/2010 | Ishiyama |
| 2010/0196740 A1 | 8/2010 | Ayama et al. |
| 2010/0209601 A1 | 8/2010 | Shimokawa et al. |
| 2010/0215992 A1 | 8/2010 | Horikawa et al. |
| 2010/0232065 A1 | 9/2010 | Suzuki et al. |
| 2010/0247965 A1 | 9/2010 | Onoue |
| 2010/0261039 A1 | 10/2010 | Itoh et al. |
| 2010/0279151 A1 | 11/2010 | Sakamoto et al. |
| 2010/0300884 A1 | 12/2010 | Homola et al. |
| 2010/0304186 A1 | 12/2010 | Shimokawa |
| 2011/0097603 A1 | 4/2011 | Onoue |
| 2011/0097604 A1 | 4/2011 | Onoue |
| 2011/0171495 A1 | 7/2011 | Tachibana et al. |
| 2011/0206947 A1 | 8/2011 | Tachibana et al. |
| 2011/0212346 A1 | 9/2011 | Onoue et al. |
| 2011/0214477 A1* | 9/2011 | Gray .................. G01L 25/003 73/1.09 |
| 2011/0223446 A1 | 9/2011 | Onoue et al. |
| 2011/0244119 A1 | 10/2011 | Umezawa et al. |
| 2011/0296899 A1* | 12/2011 | Metzger ................ G01G 17/04 73/1.13 |
| 2011/0299194 A1 | 12/2011 | Aniya et al. |
| 2011/0311841 A1 | 12/2011 | Saito et al. |
| 2012/0069466 A1 | 3/2012 | Okamoto et al. |
| 2012/0070692 A1 | 3/2012 | Sato et al. |
| 2012/0077060 A1 | 3/2012 | Ozawa |
| 2012/0118649 A1 | 5/2012 | Clark et al. |
| 2012/0127599 A1 | 5/2012 | Shimokawa et al. |
| 2012/0127601 A1 | 5/2012 | Suzuki et al. |
| 2012/0129009 A1 | 5/2012 | Sato et al. |
| 2012/0140359 A1 | 6/2012 | Tachibana |
| 2012/0141833 A1 | 6/2012 | Umezawa et al. |
| 2012/0141835 A1 | 6/2012 | Sakamoto |
| 2012/0148875 A1 | 6/2012 | Hamakubo et al. |
| 2012/0156523 A1 | 6/2012 | Seki et al. |
| 2012/0164488 A1 | 6/2012 | Shin et al. |
| 2012/0170152 A1 | 7/2012 | Sonobe et al. |
| 2012/0171369 A1 | 7/2012 | Koike et al. |
| 2012/0175243 A1 | 7/2012 | Fukuura et al. |

(56) References Cited

U.S. PATENT DOCUMENTS

| | | |
|---|---|---|
| 2012/0189872 A1 | 7/2012 | Umezawa et al. |
| 2012/0196049 A1 | 8/2012 | Azuma et al. |
| 2012/0207919 A1 | 8/2012 | Sakamoto et al. |
| 2012/0225217 A1 | 9/2012 | Itoh et al. |
| 2012/0251842 A1 | 10/2012 | Yuan et al. |
| 2012/0251846 A1 | 10/2012 | Desai et al. |
| 2012/0276417 A1 | 11/2012 | Shimokawa et al. |
| 2012/0308722 A1 | 12/2012 | Suzuki et al. |
| 2013/0040167 A1 | 2/2013 | Alagarsamy et al. |
| 2013/0071694 A1 | 3/2013 | Srinivasan et al. |
| 2013/0098136 A1 | 4/2013 | Yao et al. |
| 2013/0165029 A1 | 6/2013 | Sun et al. |
| 2013/0175252 A1 | 7/2013 | Bourez |
| 2013/0216865 A1 | 8/2013 | Yasumori et al. |
| 2013/0230647 A1 | 9/2013 | Onoue et al. |
| 2013/0247689 A1* | 9/2013 | Thanigachalam .... G01L 9/0054 73/862.627 |
| 2013/0314815 A1 | 11/2013 | Yuan et al. |
| 2014/0011054 A1 | 1/2014 | Suzuki |
| 2014/0044992 A1 | 2/2014 | Onoue |
| 2014/0050843 A1 | 2/2014 | Yi et al. |
| 2014/0262557 A1* | 9/2014 | Johnson ............... G01G 3/1412 177/211 |

* cited by examiner

SYSTEMS AND METHODS FOR CALIBRATING A LOAD CELL OF A DISK BURNISHING MACHINE

CROSS-REFERENCE TO RELATED APPLICATION(S)

This application claims priority to and the benefit of U.S. Provisional Application No. 61/882,707 filed on Sep. 26, 2013, and entitled, "SYSTEMS AND METHODS FOR CALIBRATING A LOAD CELL OF A DISK BURNISHING MACHINE", the entire content of which is incorporated herein by reference.

BACKGROUND

Disk burnishing/wiping machines are often used to burnish/wipe both sides of a disk surface (such as a fabricated disk substrate for a magnetic recording system of a hard disk drive) to ensure particles and other debris are removed and thereby make the disk surface cleaner. In this process, a disk is clamped to a spindle which rotates the disk during the burnishing process. While the disk is being rotated, two sides of a contact roller (pad) of the burnishing unit with a very fine abrasive tape move toward the disk surface simultaneously, and bring the tape surface against the disk surface with a certain pressure/force to burnish both sides of the disk surface. The particles on the disk surface are thereby removed and/or reduced. In a subsequent processing step that operates in a similar way, a wiping unit with a woven cotton tape can be applied to remove the debris on the burnished disk surface, making the disk surface smoother and cleaner consequently.

During the burnishing/wiping process, a significant parameter for process quality is the loading force which is exerted on the disk surface by the burnishing/wiping unit through the contact roller or pad. For high product yield and positive testing results, it is best that the applied loading force is very accurate and consistent. More specifically, it is best that side-to-side loading force variations and machine-to-machine loading force variations are minimal or non-existent. To achieve this, the load cell, which measures the loading force, needs to be calibrated accurately and repeatedly.

In commonly used burnishing/wiping machines, a small load cell is tightly glued in a load cell bracket which is attached in a vertical orientation to a load force adjustment mechanism. The control and feedback wiring of the load cell are routed through various machine components, and are thus hidden inside. As such, it can be difficult to calibrate the load cell for a number of reasons. First, space limitations in the burnishing machine often do not allow existing load cell calibration tools to be used. Second, the load cell is small and often positioned vertically in the burnishing machine, which can make calibration extremely difficult or virtually impossible without dismantling it. At the same time, the load cell is tightly glued to the load cell bracket, and thus dismantling it will most likely damage the load cell. Third, the load cell control/feedback wiring is hidden inside the machine and it is troublesome to disconnect this wiring. Fourth, a small protrusion on load cell surface, which effectively is the force measuring surface of the load cell, can make it difficult to balance any calibration tool on the protrusion. No calibration method or tools have been developed that effectively address these problems.

For these reasons, a calibration method for this kind of load cell is highly desirable for the disk fabrication industry. In addition, it is desirable that any such calibration method be practicable with high accuracy and good repeatability.

DETAILED DESCRIPTION

Figure 1:
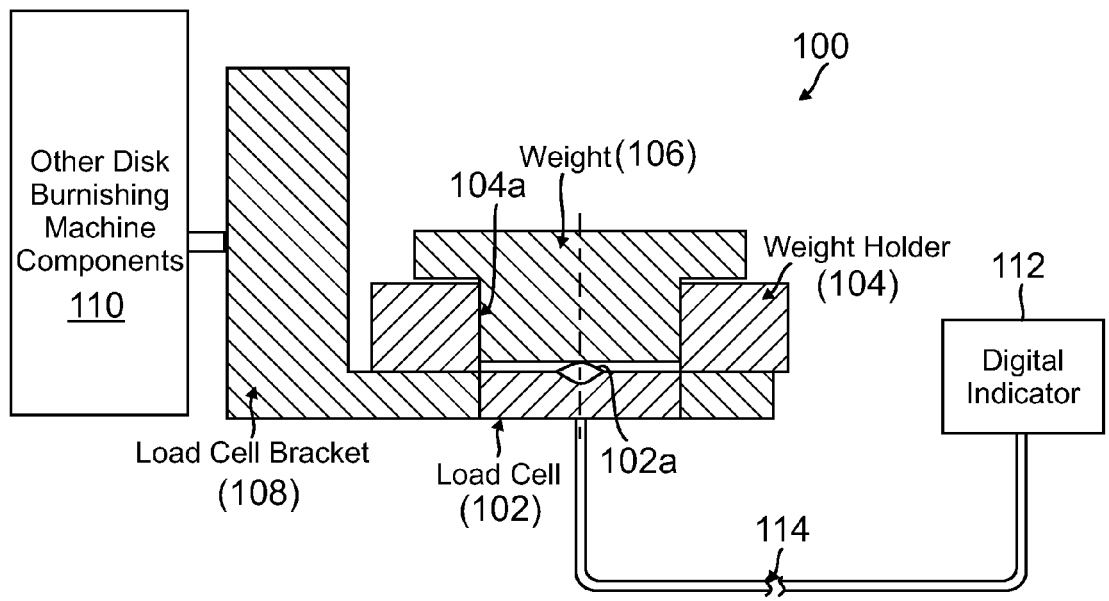
FIG. 1 is a schematic cross sectional view of a calibration system for performing in situ testing of a load cell of a disk burnishing machine, where the calibration system includes a weight holder, a weight, and various components of the disk burnishing machine in accordance with one embodiment of the invention.

Referring now to the drawings, embodiments of systems and methods for performing in situ testing of a load cell disposed within a disk burnishing machine are illustrated. The systems can include a load cell bracket attached to a component of the disk burnishing machine, where the load cell to be tested is mounted within the load cell bracket and has a force measuring surface. The load cell bracket can be positioned such that the force measuring surface of the load cell faces a direction that is about opposite to a direction of gravity. The systems can further include a preselected weight and a weight holder configured to receive the preselected weight, where the weight holder is configured to be mounted to the load cell bracket and aligned with the load cell. The preselected weight can be positioned within the weight holder, once it has been mounted and aligned, and on the force measuring surface of the load cell. The load cell can then be tested, calibrated, and/or replaced if necessary.

The methods can involve providing a load cell bracket attached to a component of the disk burnishing machine, where the load cell is mounted within the load cell bracket and has a force measuring surface, moving the load cell bracket such that the force measuring surface of the load cell faces a direction that is about opposite to a direction of gravity, aligning and mounting a weight holder on the load cell bracket, installing a preselected weight within the weight holder and on the force measuring surface of the load cell, and determining whether a weight measurement of the load cell is within a preselected tolerance of a weight of the preselected weight. In some embodiments, if the load cell is not within the preselected weight tolerance, then the load cell can be replaced.

The systems and methods can provide a fast, on-site accurate calibration with good repeatability. In several embodiments, the weight holder is configured to receive the calibrated weight in a precisely machined circular hole. This hole holds the weight and also enables the weight to balance on a protrusion (e.g., force measuring surface) of the load cell. The precisely machined hole and ability to properly balance on the protrusion can enable accurate and repeatable loading force readings.

It shall be appreciated by those skilled in the art in view of the present disclosure that although various exemplary fabrication methods are discussed herein with reference to magnetic recording disks, the methods, with or without some modifications, may be used for fabricating other types of recording disks, for example, optical recording disks such as a compact disc (CD) and a digital-versatile-disk (DVD), or magneto-optical recording disks, or ferroelectric data storage devices.

FIG. 1 is a schematic cross sectional view of a calibration system 100 for performing in situ testing of a load cell 102 of a disk burnishing machine, where the calibration system 100 includes a weight holder 104, a weight 106, and various components of the disk burnishing machine in accordance with one embodiment of the invention. The weight holder 104 includes a circular hole 104a, precisely machined, for receiving the weight 106. The weight holder 104 is mounted on a load cell bracket 108 of the burnishing machine. The load cell bracket 108 is mounted to one or more other components 110 of the disk burnishing machine. The load cell 102 is glued and thereby effectively embedded in the load cell bracket 108. The load cell 102 is coupled to a digital indicator 112 by cell wiring 114. The weight 106 has been placed within the machined hole 104a of the weight holder 104 and rests on a force measuring surface 102a (e.g., a top surface of the small centrally located protrusion) of the load cell 102. From this position, a user of the calibration system can determine whether the measured weight of the load cell 102 is within a preselected tolerance of the weight 106 (e.g., a preselected weight having a well known and accurately determined weight). If the measured weight is not within the preselected tolerance, the user can replace the load cell. In some embodiments, the user may instead recalibrate the load cell 102 and/or digital indicator 110 to have a more accurate reading based on the degree of error in the load cell 102.

Figure 2:
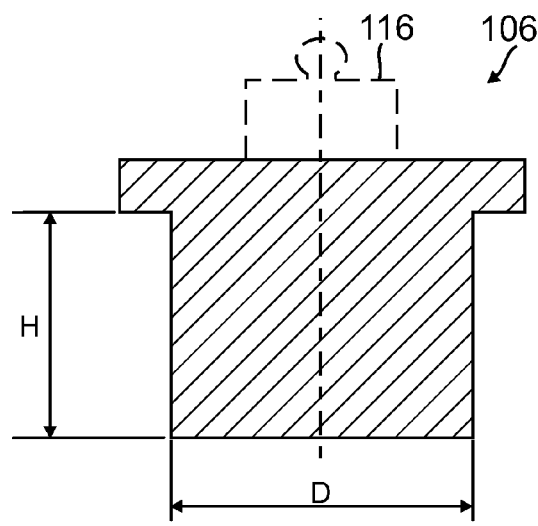
FIG. 2 is a cross sectional view of the weight of the load cell calibration system of FIG. 1 in accordance with one embodiment of the invention.

FIG. 2 is a cross sectional view of the weight 106 of the load cell calibration system 100 of FIG. 1 in accordance with one embodiment of the invention. The weight 106 is precisely machined to have a height (H) and a diameter (D) suitable for a clearance fit with the machined hole 104a of the weight holder 104. In a number of embodiments, the weight 106 has a flat or substantially flat top surface to support an additional weight 116.

Figure 3A:
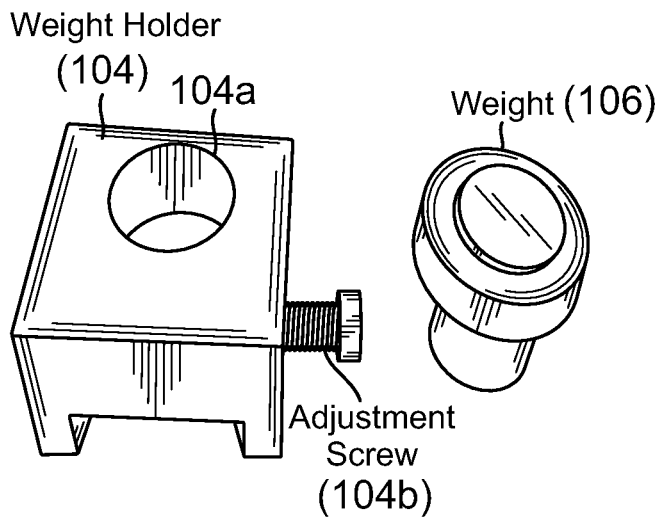
FIG. 3a is a top perspective view of the weight holder and the weight of the load cell calibration system of FIG. 1, where the weight holder includes a machined hole and an adjustment screw and is spaced apart from the weight in accordance with one embodiment of the invention.

FIG. 3a is a top perspective view of the weight holder 104 and the weight 106 of the load cell calibration system 100 of FIG. 1, where the weight holder 104 includes a machined hole 104a and an adjustment screw 104b and is spaced apart from the weight 106 in accordance with one embodiment of the invention. In operation, the adjustment screw 104b can be used to secure the weight holder 104 to the load cell bracket 108. Once the weight holder 104 is mounted to the load cell bracket 108, the weight 106 can be placed in the hole 104a and on the load cell 102 (see the configuration of FIG. 1 for example) such that the load cell can be tested for accuracy.

As to the design of the circular machined hole 104a of the weight holder 104, the machined hole 104a functions as both a weight housing and a guide for the weight 106. Therefore, in several embodiments, it can be precisely machined. For example, in several embodiments, the hole should be precisely machined with the allowable size tolerance (diameter, height), form tolerance and position tolerance (e.g., circularity, cylindricity, and perpendicularity tolerances) to ensure that the weight 106 is balanced or about balanced on the load cell 102a.

In some embodiments, the side surfaces defining the hole 104a should be machined sufficiently smooth as to allow the weight to be inserted inside in a smooth fashion with relatively small clearance. In several embodiments, the hole's height should be controlled properly (not too high and not too low) to avoid allowing the weight to tilt and thereby generate inaccurate readings on the load cell indicator.

In one embodiment, for example, the machined hole 104a has a roundness tolerance of plus or minus 15 microns (e.g., about 15 microns), a cylindricity tolerance of plus or minus 15 microns (e.g., about 15 microns), an average surface roughness (Ra) of less than 1.6 microns (e.g., about 1.6 microns), and a perpendicularity tolerance with respect to a bottom surface of the hole of plus or minus 15 microns (e.g., about 15 microns). The hole 104a can also have a position tolerance of plus or minus 20 microns (e.g., about 20 microns). Where the term "about" is used herein in describing a parameter, a 5 to 10 percent tolerance, or other customary tolerance in the art, might be expected.

In one embodiment, each of the surfaces of the weight holder 104 can have a flatness tolerance of plus or minus 25 microns (e.g., about 25 microns). In one embodiment, the weight 106 can have a roundness tolerance of plus or minus 15 microns (e.g., about 15 microns), a cylindricity tolerance of plus or minus 15 microns (e.g., about 15 microns), and an average surface roughness (Ra) of less than 1.6 microns (e.g., about 1.6 microns).

In other embodiments, the weight holder 104 and weight 106 can have other suitable tolerances.

Figure 3B:
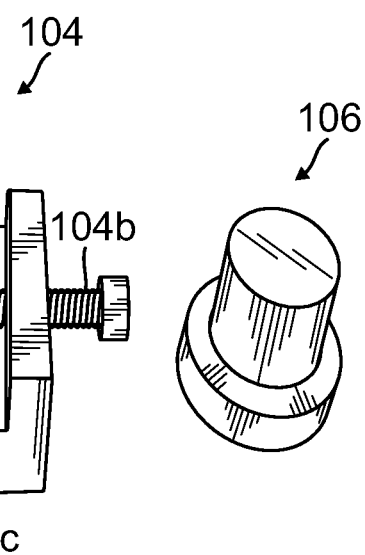
FIG. 3b is a bottom perspective view of the weight holder and the weight of the load cell calibration system of FIG. 1 in accordance with one embodiment of the invention.
Figure 3C:
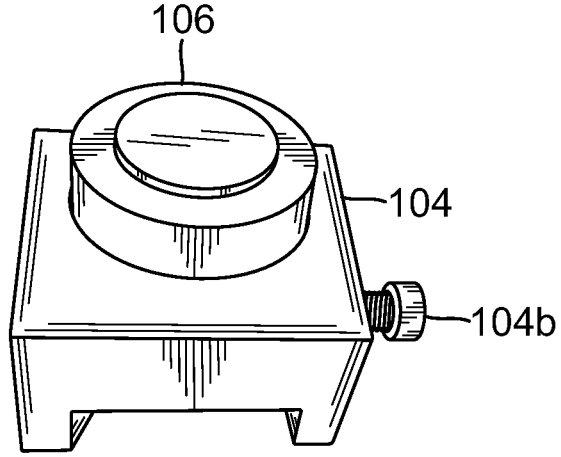
FIG. 3c is a top perspective view of the weight holder and the weight of the load cell calibration system of FIG. 1 after the weight has been inserted into the machined hole of the weight holder in accordance with one embodiment of the invention.

The weight 106 can be designed as shown in FIG. 3a and FIG. 2 (see also FIGS. 3b and 3c). In several embodiments, the illustrated weights provide a solution to calibrate the load cell with one or more weights. That is, additional weights can be placed on the top surface of the weight 106 to ensure proper calibration for greater overall weight.

In the embodiment illustrated in FIG. 3a and FIG. 2, the weight 106 has a preselected shape defined by a first cylindrical portion and a second cylindrical portion, where a diameter of the first cylindrical portion (e.g., head portion) is greater than that of the second cylindrical portion (e.g., shaft portion). In such case, the second cylindrical/shaft portion is configured to fit within the hole 104a, and the first cylindrical/head portion includes a substantially flat top surface area configured to support a second weight.

As to the second cylindrical portion (e.g., shaft portion) of the weight 106, it can be precisely machined with allowable size tolerances, form and position tolerances, and good smoothness as described above. In several embodiments, the diameter of the shaft portion of the weight should be machined to be slightly smaller than that of the hole 104a of the weight holder 104, while the height of the shaft portion is expected to be slightly greater than that of the hole to avoid allowing the head portion to rest on the weight holder during calibration. In one embodiment, the weight 106 has a weight tolerance of plus or minus 0.1 grams (e.g., about 0.1 grams).

As described above, the weight 106 can be designed to have the flat top surface to allow additional weights to be added for calibrating a range of loading forces for the load cell 102. For example, in some embodiments, the calibration process may involve starting with a 20 gram weight and then adding additional 10 or 20 gram weights all the way up to about 100 grams. In one such embodiment, weights of 20, 40, and 60 grams can be used for calibration. In some embodiments, the weight top surface can have other shapes conducive to supporting one or more precise weights. For example, in one embodiment, the weight has a simple cylinder shape.

FIG. 3b is a bottom perspective view of the weight holder 104 and the weight 106 of the load cell calibration system 100 of FIG. 1 in accordance with one embodiment of the invention. As can be seen in FIGS. 3a and 3b, the weight holder 104 has a main body having a rectangular block shape having a top surface and a bottom surface, where the hole 104a extends from the top surface to the bottom surface, and where the top surface and the bottom surface each have a larger surface area than that of the other sides of the block shape. In addition, the weight holder 104 has two side walls extending from the bottom surface of the main body along the longer edges of the bottom surface. The hole 104a of the weight holder 104 includes a counter-bore portion 104c at the bottom surface. This counter-bore portion 104c can provide clearance to ensure that the weight holder 104 does not make contact with the load cell 102 after alignment and mounting (see FIG. 1). The adjustment screw 104b can be advanced through a threaded hole in one of the side walls of the weight holder 104 by turning the screw 104b.

As to the design of the locating surface (e.g., bottom surface coming into contact with the load cell bracket), it is shaped to effectively fit with the top surface of load cell bracket 108 (see FIG. 1). The adjustment screw 104b provides the capability to fine-tune and secure the weight holder 104 horizontally (see FIGS. 3a to 3c). More specifically, the adjustment screw 104b can provide a lateral force to the load cell bracket 108 to secure the weight holder 104 to the load cell bracket 108 and/or align the hole 104a of the weigh holder 104 over the load cell 102 (see also FIG. 4c).

In a number of embodiments, the weight holder 104 is shaped (e.g., the locating surface with the hole 104a and the counter-bore portion 104c) such that the weight holder 104 does not make contact with the load cell 102 after alignment.

FIG. 3c is a top perspective view of the weight holder 104 and the weight 106 of the load cell calibration system 100 of FIG. 1 after the weight 106 has been inserted into the machined hole 104a of the weight holder 104 in accordance with one embodiment of the invention.

FIGS. 4a to 4d illustrate a sequence of perspective views of a disk burnishing machine 200, a weight holder 204, and a weight 206 during an in situ process 300 for testing a load cell 202 within the disk burnishing machine 200 in accordance with one embodiment of the invention.

Figure 4A:
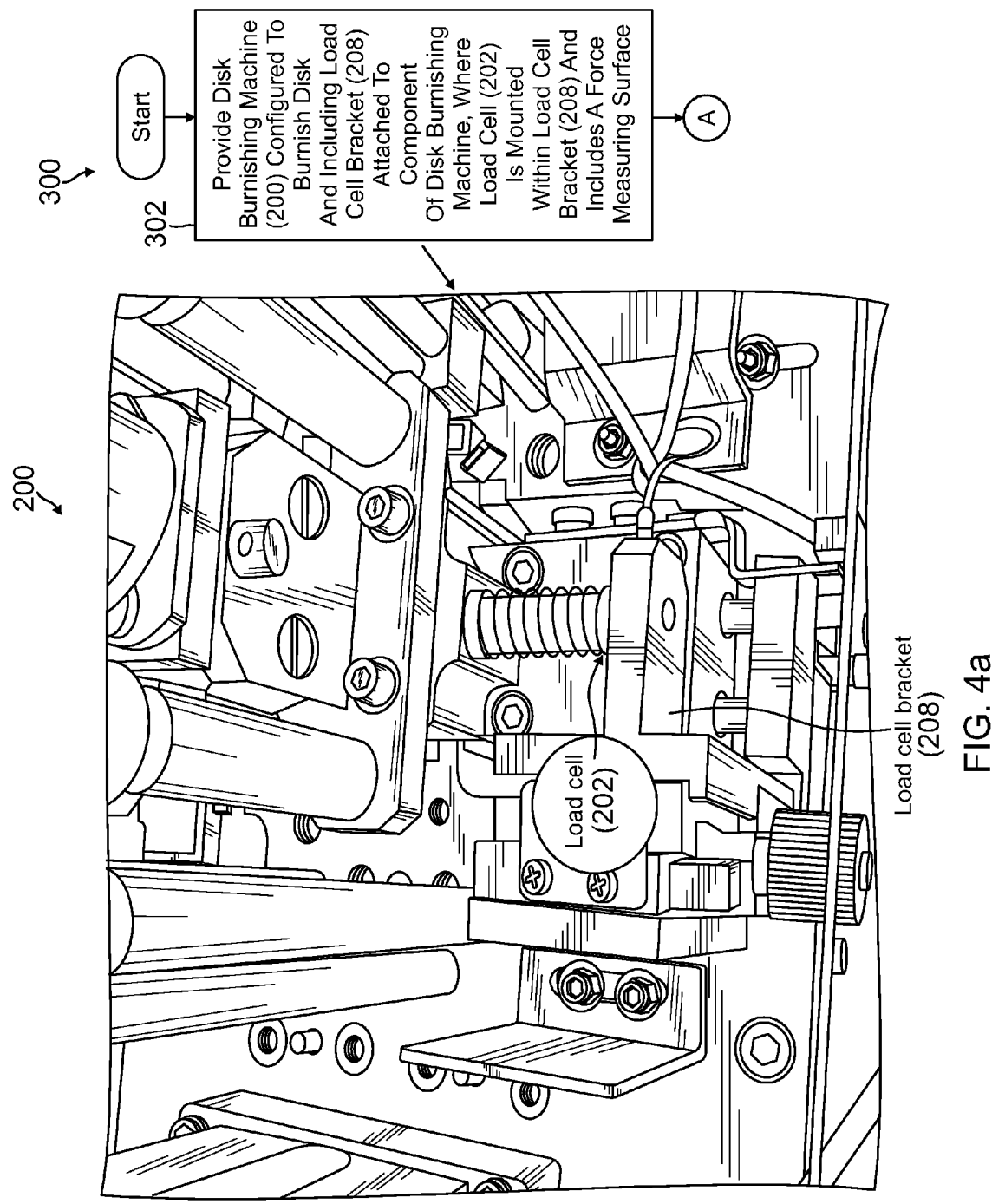
FIGS. 4a to 4d illustrate a sequence of perspective views of a disk burnishing machine, a weight holder, and a weight during an in situ process for testing a load cell within the disk burnishing machine in accordance with one embodiment of the invention.

In FIG. 4a, the process 300 first provides (302) the disk burnishing machine 200 which is configured to burnish a disk and includes a load cell bracket 208 attached to a component of the disk burnishing machine 200. In such case, the load cell 202 (not visible in FIG. 4a but see FIGS. 4b and 4c) is mounted within the load cell bracket 208 and includes a force measuring surface 202a (not visible in FIG. 4a but see FIGS. 4b and 4c). In this stage of the process (302), the load cell bracket 208 is vertically oriented such that the load cell 202, though not visible, is vertically oriented to measure the force associated with the spring loaded shaft directed into the load cell bracket 208.

Figure 4B:
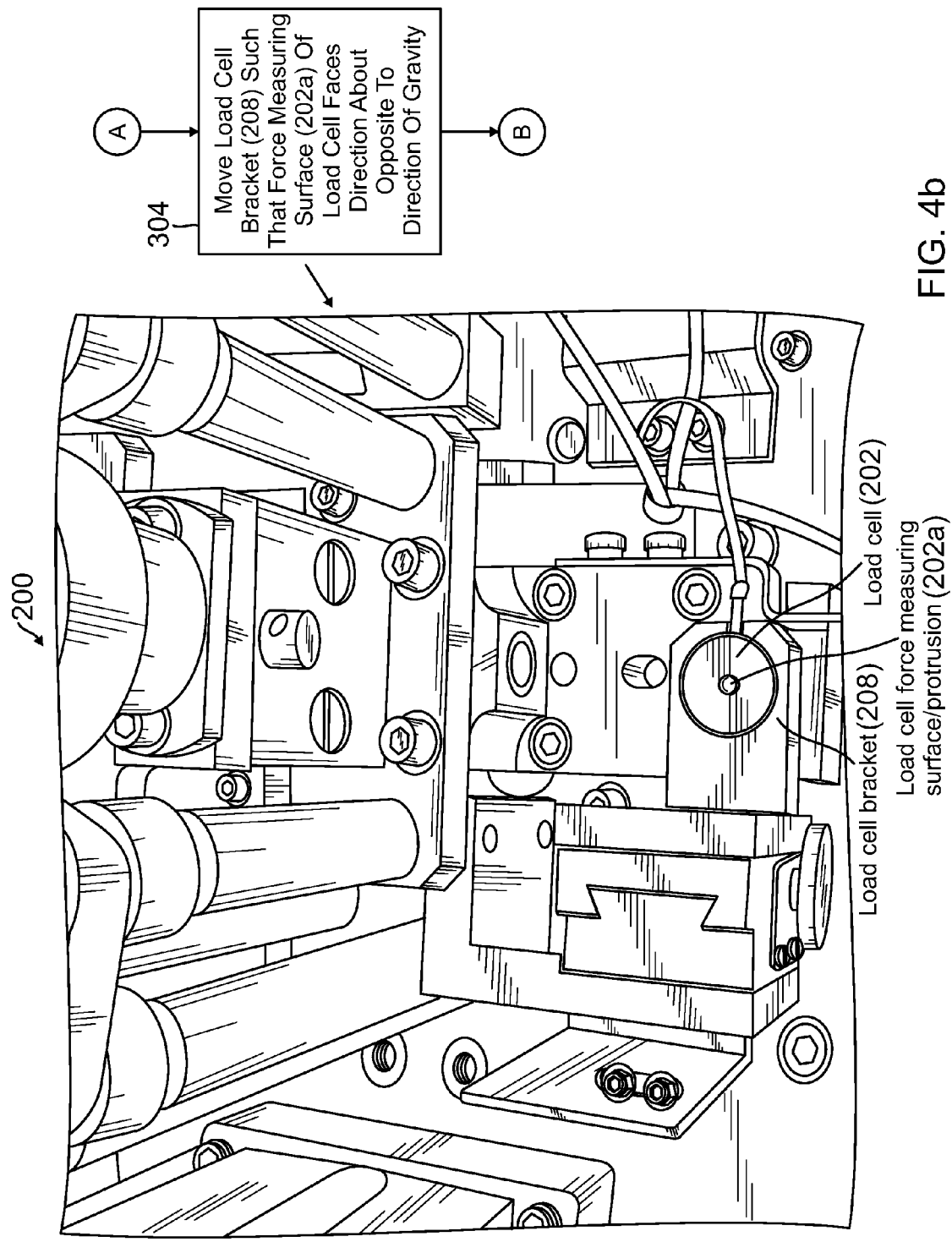

In FIG. 4b, the process moves/rotates (304) the load cell bracket 208 such that the force measuring surface 202a (e.g., central protrusion) of the load cell 202 faces a direction about opposite to the direction of gravity. In such case, the load cell bracket 208 and load cell 202 have effectively been horizontally oriented. In several embodiments, this adjustment of the load cell bracket 208 can prepare it to receive the weight holder and ultimately the calibration weight. In one embodiment, the movement/rotation of the load cell bracket 208 can involve slight dismantling of the bracket 208 and the related spring loaded shaft.

Figure 4C:
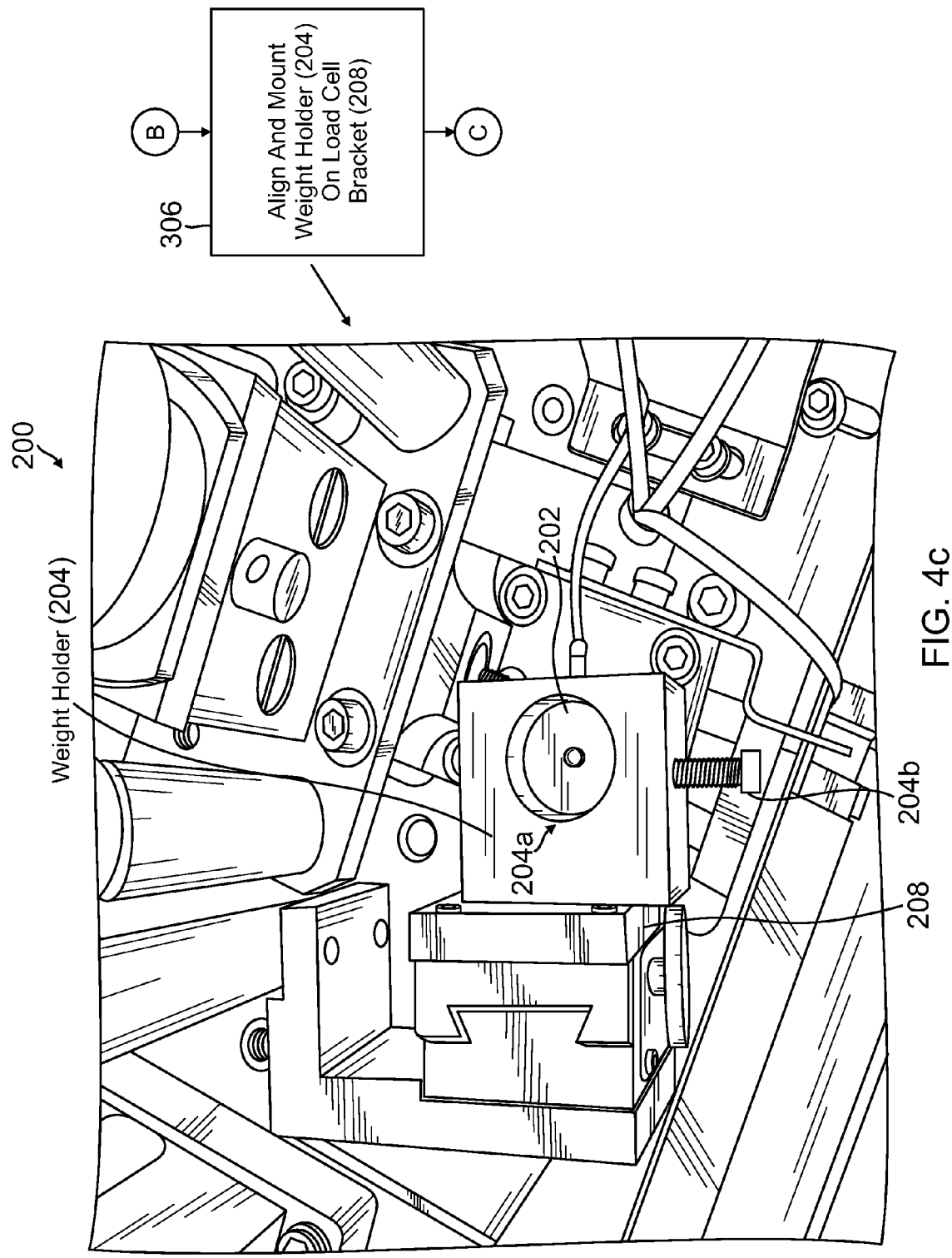

In FIG. 4c, the process aligns and mounts (306) the weight holder 204 on the load cell bracket 208. The adjustment screw 204b can be used to securely mount the weight holder 204 to the load cell bracket 208. A user, possibly using the adjustment screw 204b, can align the hole 204a of the weight holder 204 to be directly over the load cell 202.

Figure 4D:
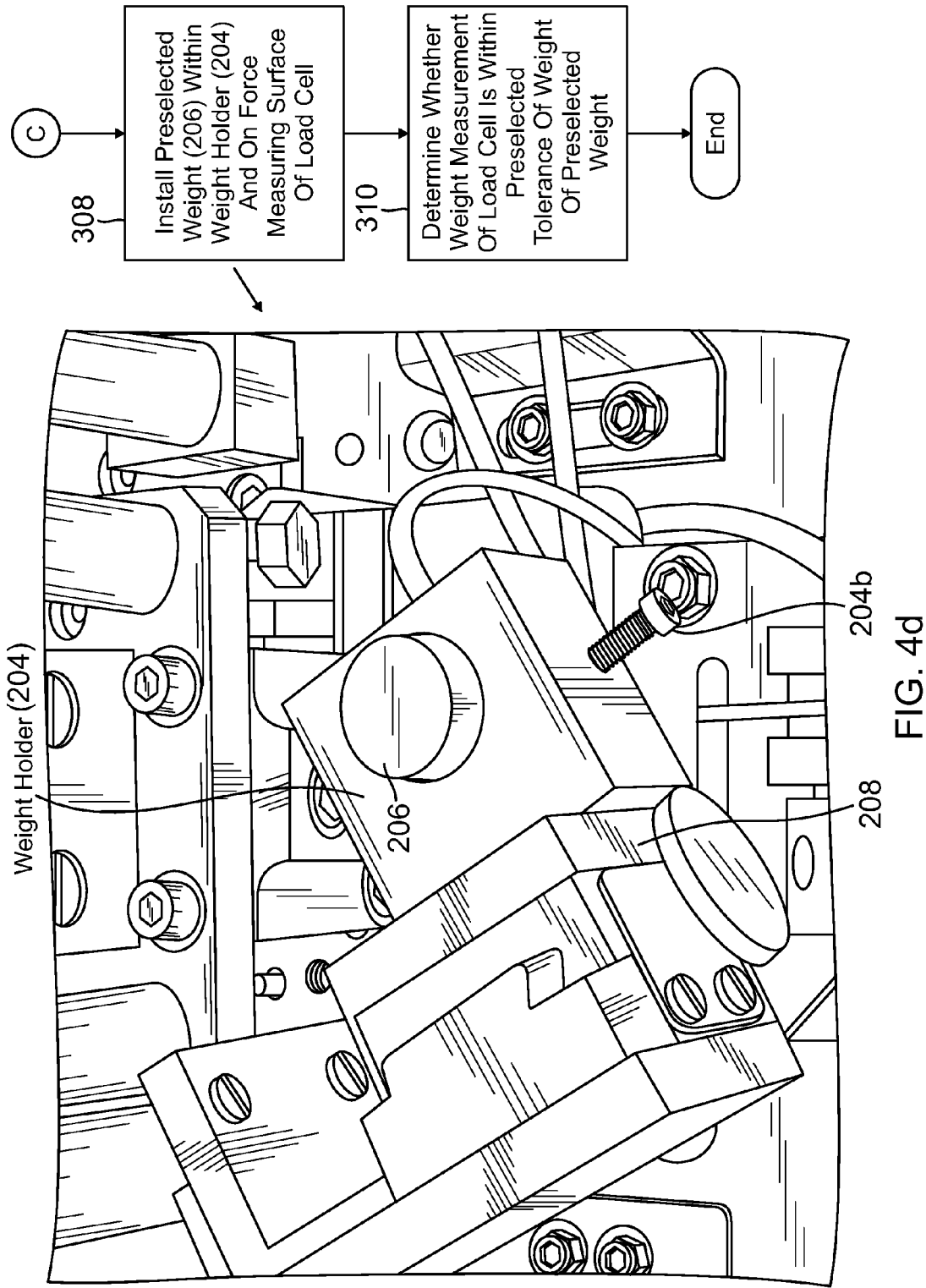

In FIG. 4d, the process then installs (308) a preselected weight 206 within the weight holder 204 and on the force measuring surface (not visible in FIG. 4d but see 202a in FIG. 4b) of the load cell (not visible in FIG. 4d but see 202 in FIG. 4b). In several embodiments, the process then determines (310) whether the weight measurement of the load cell is within a preselected tolerance of the expected weight of the preselected weight 206. In a number of embodiments, if the measurement is not within a preselected tolerance of the expected weight, the load cell is replaced. In other embodiments, the load cell and or display may be calibrated and adjusted to compensate for the load cell inaccuracy.

In several embodiments, the calibration process 300 advantageously does not require the disk burnishing machine to be disassembled.

In one embodiment, the process can perform the sequence of actions in a different order. In another embodiment, the process can skip one or more of the actions. In other embodiments, one or more of the actions are performed simultaneously. In some embodiments, additional actions can be performed.

Embodiments of the invention can provide a number of advantages. For example, in several embodiments, the invention provides high accuracy and good repeatability where embodiments of the methods described herein use the calibrated weight as a gauge and the precisely machined circular hole as a weight guide to ensure accurate and repeatable calibration. In several embodiments, the invention enables in situ calibration without dismantling load cell. More specifically, these embodiments can accommodate the limited space of a disk burnishing machine and do not require fully dismantling the load cell and/or its control/feedback wiring which makes the existing machine's digital indicator for the load cell usable for calibration. Among other things, this avoids bringing in an additional indicator, and enables fast, in situ calibration.

In several embodiments, the invention can also involve simplicity in design and fabrication where the calibration tools can effectively consist of a cylindrical weight and its holding fixture only. In such case, the calibration tools can be easily fabricated with relatively low cost. In several embodiments, the calibration tools described herein can be easily employed such that they provide an easy and practical way to locate (e.g., attach to) the load cell bracket. In several embodiments, the calibration tools described herein easily provide for calibration of a range of load forces by enabling the addition of standard weights directly onto a flat top surface of the weight.

While the above description contains many specific embodiments of the invention, these should not be construed as limitations on the scope of the invention, but rather as examples of specific embodiments thereof. Accordingly, the scope of the invention should be determined not by the embodiments illustrated, but by the appended claims and their equivalents.

The various features and processes described above may be used independently of one another, or may be combined in various ways. All possible combinations and sub-combinations are intended to fall within the scope of this disclosure. In addition, certain method, event, state or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other suitable manner. Tasks or events may be added to or removed from the disclosed example embodiments. The example systems and components described herein may be configured differently than described. For example, elements may be added to, removed from, or rearranged compared to the disclosed example embodiments.

What is claimed is:

1. A system for performing in situ testing of a load cell of a disk burnishing machine, the system comprising:
    the disk burnishing machine configured to burnish a disk, the disk burnishing machine comprising:
        a load cell bracket attached to a component of the disk burnishing machine; and
        wherein the load cell is mounted within the load cell bracket and comprises a force measuring surface, and
        wherein the load cell bracket is configured to be oriented such that the force measuring surface of the load cell faces a direction that is about opposite to a direction of gravity;
    a preselected weight; and
    a weight holder configured to receive the preselected weight, wherein the weight holder is configured to be mounted to the load cell bracket and to be aligned with the load cell,
    wherein the preselected weight is configured to be positioned within the weight holder and on the force measuring surface of the load cell.

2. The system of claim 1, wherein the weight holder comprises a hole for receiving the preselected weight.

3. The system of claim 2, wherein the hole of the weight holder comprises a cylindrical shape and is machined to have:
    a roundness tolerance of plus or minus about 15 microns,
    a cylindricity tolerance of plus or minus about 15 microns,
    an average surface roughness of less than about 1.6 microns, and
    a perpendicularity tolerance to a bottom surface of the hole of plus or minus about 15 microns.

4. The system of claim 1, wherein the preselected weight comprises a weight tolerance of plus or minus about 0.1 grams.

5. The system of claim 1, wherein the weight holder is shaped such that the weight holder does not make contact with the load cell after alignment.

6. The system of claim 5:
    wherein the weight holder comprises a hole for receiving the preselected weight;
    wherein the hole of the weight holder comprises a counter-bore portion at an end of the hole, the end configured to be mounted adjacent to the load cell; and
    wherein the counter-bore portion provides clearance to ensure that the weight holder does not make contact with the load cell after alignment.

7. The system of claim 1, wherein the preselected weight comprises a substantially flat top surface area configured to support a second preselected weight.

8. The system of claim 1:
    wherein the preselected weight comprises a first cylindrical portion and a second cylindrical portion;
    wherein a diameter of the first cylindrical portion is greater than that of the second cylindrical portion;
    wherein the second cylindrical portion is configured to fit within the hole; and
    wherein the first cylindrical portion comprises a substantially flat top surface area configured to support a second preselected weight.

9. The system of claim 1, wherein the weight holder comprises an adjustment screw for aligning the weight holder with the load cell and for mounting the weight holder to the load cell bracket.

10. The system of claim 1, wherein the weight holder comprises:
    a main body having a rectangular block shape having a top surface and a bottom surface, wherein a hole extends from the top surface to the bottom surface, and wherein the top surface and the bottom surface each have a larger surface area than that of the other sides of the block shape; and
    two side walls extending from the bottom surface of the main body along the longer edges of the bottom surface,
    wherein the hole of the weight holder comprises a counter-bore portion at the bottom surface.

11. The system of claim 10, wherein the weight holder comprises an adjustment screw threaded through a hole in one of the two side walls, the adjustment screw for aligning the weight holder with the load cell and for mounting the weight holder to the load cell bracket.

12. The system of claim 1, wherein the disk burnishing machine further comprises a load cell indicator configured to display a weight corresponding to a force applied to the force measuring surface of the load cell.

13. The system of claim 1, wherein the disk comprises a magnetic recording layer configured to store information.

14. A method for performing in situ testing of a load cell of a disk burnishing machine, the method comprising:
    providing the disk burnishing machine configured to burnish a disk, the disk burnishing machine comprising:
        a load cell bracket attached to a component of the disk burnishing machine; and
        wherein the load cell is mounted within the load cell bracket and comprises a force measuring surface,
    moving the load cell bracket such that the force measuring surface of the load cell faces a direction that is about opposite to a direction of gravity;
    aligning and mounting a weight holder on the load cell bracket;
    installing a preselected weight within the weight holder and on the force measuring surface of the load cell; and
    determining whether a weight measurement of the load cell is within a preselected tolerance of a weight of the preselected weight.

15. The method of claim 14, further comprising replacing the load cell if the weight measurement of the load cell is not within the preselected tolerance.

16. The method of claim 14, wherein the weight holder comprises a hole for receiving the preselected weight.

17. The method of claim 16, wherein the hole of the weight holder comprises a cylindrical shape and is machined to have:
    a roundness tolerance of plus or minus about 15 microns,
    a cylindricity tolerance of plus or minus about 15 microns,
    an average surface roughness of less than about 1.6 microns, and a perpendicularity tolerance to a centerline of the hole of plus or minus about 15 microns.

18. The method of claim 14, wherein the preselected weight comprises a weight tolerance of plus or minus about 0.1 grams.

19. The method of claim 14, wherein the weight holder is shaped such that the weight holder does not make contact with the load cell after alignment.

20. The method of claim 19:
wherein the weight holder comprises a hole for receiving the preselected weight;
wherein the hole of the weight holder comprises a counter-bore portion at an end of the hole mounted adjacent to the load cell; and
wherein the counter-bore portion provides clearance to ensure that the weight holder does not make contact with the load cell after alignment.

21. The method of claim 14, wherein the preselected weight comprises a substantially flat top surface area configured to support a second preselected weight.

22. The method of claim 14:
wherein the preselected weight comprises a first cylindrical portion and a second cylindrical portion;
wherein a diameter of the first cylindrical portion is greater than that of the second cylindrical portion;
wherein the second cylindrical portion is configured to fit within the hole; and
wherein the first cylindrical portion comprises a substantially flat top surface area configured to support a second preselected weight.

23. The method of claim 14, wherein the weight holder comprises an adjustment screw for aligning the weight holder with the load cell and for mounting the weight holder to the load cell bracket.

24. The method of claim 14, wherein the weight holder comprises:
a main body having a rectangular block shape having a top surface and a bottom surface, wherein a hole extends from the top surface to the bottom surface, and wherein the top surface and the bottom surface each have a larger surface area than that of the other sides of the block shape; and
two side walls extending from the bottom surface of the main body along the longer edges of the bottom surface, wherein the hole of the weight holder comprises a counter-bore portion at the bottom surface.

25. The method of claim 24, wherein the weight holder comprises an adjustment screw threaded through a hole in one of the two side walls, the adjustment screw for aligning the weight holder with the load cell and for mounting the weight holder to the load cell bracket.

26. The method of claim 14, wherein the disk burnishing machine further comprises a load cell indicator configured to display a weight corresponding to a force applied to the force measuring surface of the load cell.

27. The method of claim 14, wherein the disk comprises a magnetic recording layer configured to store information.

28. The method of claim 14, wherein the method does not require the disk burnishing machine to be fully disassembled.

29. The method of claim 14, wherein the weight holder and the preselected weight are configured to allow relative movement therebetween.

30. The system of claim 1, wherein the weight holder and the preselected weight are configured to allow relative movement therebetween.

* * * * *